(12) United States Patent
Witt et al.

(10) Patent No.: US 9,049,338 B2
(45) Date of Patent: Jun. 2, 2015

(54) INTERACTIVE VIDEO COLLABORATION FRAMEWORK

(75) Inventors: Daniel Witt, Center Moriches, NY (US);
Jon Rachwalski, Holbrook, NY (US);
Evgeny Nechaev, Babylon, NY (US);
Jun Zhang, Huntington Station, NY (US)

(73) Assignee: Vectormax Corporation, Farmingdale, NY (US)

( * ) Notice: Subject to any disclaimer, the term of this patent is extended or adjusted under 35 U.S.C. 154(b) by 177 days.

(21) Appl. No.: 13/595,796

(22) Filed: Aug. 27, 2012

(65) Prior Publication Data

US 2013/0169741 A1    Jul. 4, 2013

Related U.S. Application Data

(62) Division of application No. 11/245,458, filed on Oct. 5, 2005, now Pat. No. 8,255,552.

(60) Provisional application No. 60/615,989, filed on Oct. 5, 2004.

(51) Int. Cl.
*H04N 7/14*        (2006.01)
*H04N 7/15*        (2006.01)
(Continued)

(52) U.S. Cl.
CPC ............ *H04N 7/15* (2013.01); *G06F 17/30017* (2013.01); *H03M 7/30* (2013.01); *H04L 1/0083* (2013.01); *H04L 12/1877* (2013.01); *H04L 29/06027* (2013.01); *H04L 63/0807* (2013.01); *H04L 63/083* (2013.01); *H04L 63/166* (2013.01); *H04L 2001/0093* (2013.01); *H04N 7/1675* (2013.01); *H04N 7/17318* (2013.01); *H04N 21/2187* (2013.01); *H04N 21/222* (2013.01); *H04N 21/2347* (2013.01); *H04N 21/25866* (2013.01); *H04N 21/25875* (2013.01); *H04N 21/26613* (2013.01); *H04N 21/4405* (2013.01); *H04N 21/47205* (2013.01); *H04N 21/4788* (2013.01); *H04N 21/6125* (2013.01); *H04N 21/63345* (2013.01); *H04N 21/6405* (2013.01); *H04N 21/84* (2013.01); *H04L 67/42* (2013.01); *H04L 65/4076* (2013.01); *H04L 65/607* (2013.01); *H04L 67/306* (2013.01); *H04L 69/22* (2013.01); *H04L 9/065* (2013.01);
(Continued)

(58) Field of Classification Search
USPC ........... 348/14.01, 14.03, 14.04, 14.08, 14.07
See application file for complete search history.

(56) References Cited

U.S. PATENT DOCUMENTS 5,915,091 A * 6/1999 Ludwig et al. ................. 709/204
6,243,129 B1 * 6/2001 Deierling ....................... 725/105
(Continued)

*Primary Examiner* — Olisa Anwah
(74) *Attorney, Agent, or Firm* — Jack Schwartz and Associates, PLLC

(57) ABSTRACT

A system for providing interactive collaboration between a plurality of users. The system includes a profile respository for storing a priority level for each of said plurality of users and providing addresses for accessing each of said plurality of users. A media content server indexes audio and video data within the system. A data server stores the audio and video data at locations identified by indexing data located at the media content server. An acquisition processor provides audio and video data streams to requesting ones of the plurality of users. Audio and video data streams are located based on indexing data within the media content server and accessed according to a priority level for each requesting user. A communication processor controls bidirectional communication between requesting users according to the priority level for each requesting user.

13 Claims, 6 Drawing Sheets

(51) Int. Cl.

| | |
|---|---|
| *G06F 17/30* | (2006.01) |
| *H03M 7/30* | (2006.01) |
| *H04L 1/00* | (2006.01) |
| *H04L 12/18* | (2006.01) |
| *H04L 29/06* | (2006.01) |
| *H04N 7/167* | (2011.01) |
| *H04N 7/173* | (2011.01) |
| *H04N 21/2187* | (2011.01) |
| *H04N 21/222* | (2011.01) |
| *H04N 21/2347* | (2011.01) |
| *H04N 21/258* | (2011.01) |
| *H04N 21/266* | (2011.01) |
| *H04N 21/4405* | (2011.01) |
| *H04N 21/472* | (2011.01) |
| *H04N 21/4788* | (2011.01) |
| *H04N 21/61* | (2011.01) |
| *H04N 21/6334* | (2011.01) |
| *H04N 21/6405* | (2011.01) |
| *H04N 21/84* | (2011.01) |
| *H04L 29/08* | (2006.01) |
| *H04L 9/06* | (2006.01) |
| *H04N 19/172* | (2014.01) |
| *H04N 19/46* | (2014.01) |
| *H04N 19/51* | (2014.01) |
| *H04N 19/107* | (2014.01) |
| *H04N 19/162* | (2014.01) |
| *H04N 19/57* | (2014.01) |
| *H04N 19/40* | (2014.01) |
| *H04N 19/583* | (2014.01) |

(52) U.S. Cl.
CPC .............. *H04N 19/172* (2014.11); *H04N 19/46* (2014.11); *H04N 19/51* (2014.11); *H04N 19/107* (2014.11); *H04N 19/162* (2014.11); *H04N 19/57* (2014.11); *H04N 19/40* (2014.11); *H04N 19/583* (2014.11)

(56) References Cited

U.S. PATENT DOCUMENTS

| | | | | |
|---|---|---|---|---|
| 6,590,602 | B1* | 7/2003 | Fernandez et al. | 348/14.08 |
| 7,269,338 | B2* | 9/2007 | Janevski | 386/201 |
| 2003/0212999 | A1* | 11/2003 | Cai | 725/119 |
| 2005/0007965 | A1* | 1/2005 | Hagen et al. | 370/260 |
| 2005/0262542 | A1* | 11/2005 | DeWeese et al. | 725/106 |
| 2006/0174312 | A1* | 8/2006 | Ducheneaut et al. | 725/135 |
| 2007/0005804 | A1* | 1/2007 | Rideout | 709/246 |
| 2009/0167839 | A1* | 7/2009 | Ottmar | 348/14.08 |

* cited by examiner

INTERACTIVE VIDEO COLLABORATION FRAMEWORK

CROSS REFERENCE TO RELATED APPLICATIONS

This application is a Divisional Application of U.S. patent application Ser. No. 11/245,458 filed on Oct. 5, 2005 which claims priority from U.S. Provisional Patent Application Ser. No. 60/615,989 filed on Oct. 5, 2004 and which has issued on Aug. 28, 2012 as U.S. Pat. No. 8,255,552.

FIELD OF THE INVENTION

The present invention relates generally to audio-video systems, and more specifically, to a system for providing a dynamic workspace application for allowing collaboration between a plurality of users.

BACKGROUND OF THE INVENTION

Existing multimedia display systems are generally used to display a single type of multimedia stream. Different types of multimedia streams include one way video where a client requests multimedia data from a server and the multimedia data is subsequently provided by the server for viewing by the client, and two-way video which encompasses video-conferencing where two users transmit multimedia data between one another. There are no multimedia systems that incorporate the different multimedia streaming technologies for use simultaneously in a single application interface (API).

Internet Protocol (IP) based delivery platforms, such as public Internet, wireless virtual private networks (VPN) and corporate networks are often use to deliver digitized video content. Because of the nature of an IP based network, it is difficult and complex to distribute live and pre-recorded video in an efficient and cost effective manner. To allow consumers, business organizations, financial institutions, educational institutions, governmental agencies, content providers and telecommunications networks to utilize the public Internet and disparate IP networks innovative methodologies must be developed.

Synchronized audio/video presentations that can be delivered unattended over intranets or the Internet are commonly known. However, currently, to view such media, one is required to use a player that is external to the web browser which must be downloaded and installed prior to viewing. Such external players use overly complex network transportation and synchronization methods which limit the quality of the audio/video and can cause the synchronization or "lip sync" between the audio and video to be noticeably off. Depending on the size of the video presentation, the user often may be required to choose a desired bandwidth to play the video/audio presentation. However, this may cause long delays since large amounts of both audio and/or video data may be extensively encoded and/or encrypted and may even involve other like complicated processes. Often, the user may watch the video presentation via the external player over a significant amount of time. As a result, decoding of the large amounts of audio and/or video data cause the video presentation to be choppy and often the audio and video are not commonly synchronized.

A system according to invention principles address these deficiencies and associated problems.

SUMMARY OF THE INVENTION

The system combines a plurality of audio-video signal types for simultaneous display at a plurality of client locations using a plurality of API's for incorporating at least one of proprietary and open-source based software modules (plug-ins) into a client-server system for delivering multimedia data to various clients. The system enables designing highly scalable multimedia systems for encoding, transmitting, receiving and displaying at least one of real-time video data streams and pre-recorded video data streams.

The system further provides multimedia data streams to a plurality of users for simultaneous viewing. The system allows at least one user to request a multimedia datastream to be viewed simultaneously by each of the users connected to the system. The system further provides for connectivity directly between the users of the system that are viewing the received multimedia data stream. The system includes a plurality of applications for governing and negotiating connection and interaction between the users. Once connected, a respective user is able to engage in bi-directional communication with any other user connected to the system. The system further allows the users to selectively manipulate and process the received and displayed data stream for later use thereof.

A system for providing interactive collaboration between a plurality of users. The system includes a profile repository for storing a priority level for each of the plurality of users and providing addresses for accessing each of the plurality of users. A media content server indexes audio and video data within the system. A data server stores the audio and video data at locations identified by indexing data located at the media content server. An acquisition processor provides audio and video data streams to requesting ones of the plurality of users. Audio and video data streams are located based on indexing data within the media content server and accessed according to a priority level for each requesting user. A communication processor controls bidirectional communication between requesting users according to the priority level for each requesting user.

DETAILED DESCRIPTION OF THE INVENTION

Figure 1:
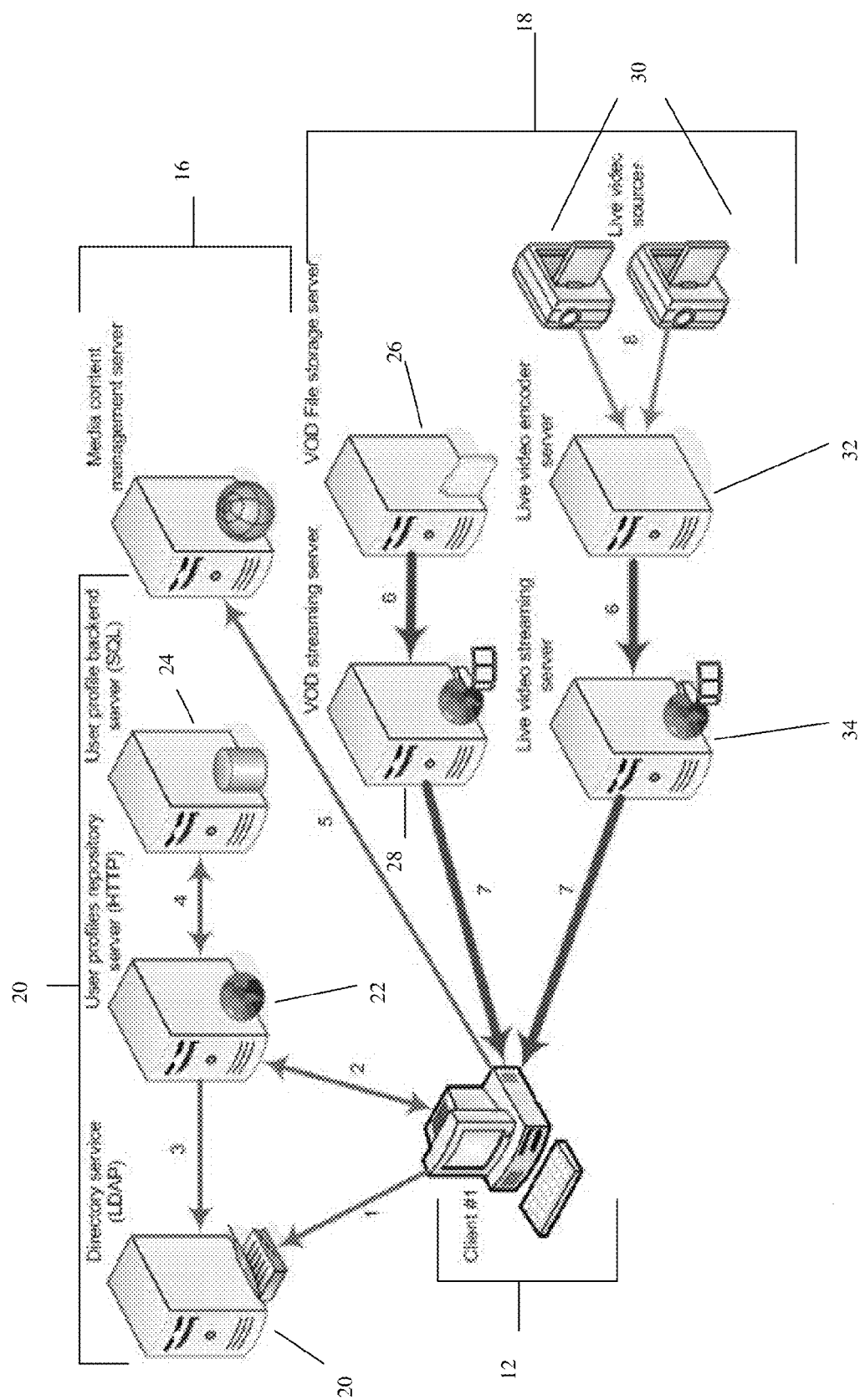
FIG. 1 is an illustrative view of a single client connecting to the integrated video collaboration system according to invention principles.

An application as used herein is an executable application comprising code or machine readable instruction for implementing predetermined functions including those of an operating system, healthcare information system or other information processing system, for example, in response user command or input. An application interface is composite user interface for operating and controlling an application. An executable procedure is a segment of code (machine readable instruction), sub-routine, or other distinct section of code or portion of an executable application for performing one or more particular processes and may include performing operations on received input parameters (or in response to received input parameters) and provide resulting output parameters. A processor as used herein is a device and/or set of machine-readable instructions for performing tasks. A processor comprises any one or combination of, hardware, firmware, and/or software. A processor acts upon information by manipulating, analyzing, modifying, converting or transmitting information for use by an executable procedure or an information device, and/or by routing the information to an output device. A processor may use or comprise the capabilities of a controller or microprocessor, for example.

Furthermore, all functions of FIGS. 1-6 can be implemented using software, hardware or a combination thereof.

Multimedia content or content stream as used herein is any encoded or un-encoded data having at least one of video data and audio data. A media player application as used herein comprises an application that allows a user to at least one of request, select, manage, view, transmit, receive and playback audio, video or audio-video data thereon. A server as used herein is a host system that is accessible from at least one remote system for the purpose of at least one of controlling network resources and exchanging data. The server includes at least one process running on the host for relaying information in response to a request from the remote system. The information relayed by a server includes, for example, requests for data, email, file transfers, and other network services from other computers. A streaming server as used herein is a dedicated system for providing a continuous data stream (encoded or un-encoded) comprising at least one of video data and audio-video data for receipt by a client application on which the data stream is able to be further processed. A plugin is an executable set of instructions able to be integrated within another application for adding at least one of a service or feature to the other application upon integration thereof. A codec is a software or hardware implemented set of instructions for at least one of reducing the number of bytes consumed by large files and programs and converting a signal from a first format into a second format for transmission of the signal. An authorization server as used herein comprises any software application or hardware apparatus able to determine if a particular user has the right or permission to use a system resource. A multicast data stream as used herein comprises a continuous stream of data having at least one of video and audio-video data encoded therein originating from a single source that is transmitted and broadcast to members of a specified group or users or a specified system.

The system provides a video collaboration application system where at least two users located at different client locations participate in two-way video data transmission while each simultaneously view a one-way video transmission at their respective locations. This allows the at least two users to participate in two-way video data transmission such as videoconferencing while each of the at least two users are viewing the same video data signal being broadcasted and/or requested from a remote source and being viewed on a local client. Thus, the Interactive Video Collaboration Framework, hereinafter IVCF, allows at least two clients to interact in real-time with one another while viewing the same synchronized live or pre-recorded video on-demand (VOD) stream.

The technology discussed below for transmitting data streams via the system is scaleable to both low and high bit rates and may be streamed from various networking protocols. The system may be used in a variety of applications and products, such as talking advertising banners, web pages, news reports, greeting cards, as well as to view E-Mail grams, web cams, security cams, archiving, and internet video telephone. The system includes a process of encoding/decoding as well as implementation, multiplexing, encryption, thread technology, plug-in technology, utilization of browser technologies, caching, buffering, synchronization and timing, line installation of the plug-in, cross platform capabilities, and bit stream control through the browser itself.

The system can be further extended for use by a portable player for at least one of streaming media playback and storage, Video E-Mail, PDA applications, Video Cell Phone, Internet Video Telephone, Videoconferencing, Wearable applications, Webcams, Security cams, Interactive Video Games, Interactive Sports applications, Archiving, Virtual Reality Modeling Language (VRML) video applications and 360-degree video technologies.

It is preferable that the IVCF be able to display or output audio/video data streams using a simple Internet browser "plug-in" which is a smaller application in terms of size as compared to an external player application which is launched outside of the web browser. Using a plug-in to display the audio/video data stream within the browser window is advantageous in that client systems not having the plug-in are able to have the plug-in provided thereto by the IVCF for rapid download and installation on the client machine prior to receipt of the audio/video data stream while the client user is accessing the IVCF. This special plug-in allows the browser to display the received audio/video data stream as naturally as it would display any built-in object such as an image. This also allows the web page itself to become the "skin" or interface around the player. Another benefit to using a web browser to play the audio/video stream is that the bit stream itself can be "conditioned" to allow a person to play the stream once, and after it has been cached, the file can be re-played at a later time without having to re-download the stream from the network, or the file may be "conditioned" to play once over the web depending on the author's preferences.

The system includes a call interface. The call interface provides an interface for handling requests and transmissions between the requesting and receiving parties. The call interface is a signaling abstraction layer and allows the application to remain compliant with SIP, H.323, etc. by updating a signaling plugin without making any change directly to the application.

The integrated video collaboration framework (IVCF) is an open architecture that allows for the integration of content from a plurality of multimedia sources for viewing with a single application program interface (API). The sources of content include but are not limited to live video streams, video-on-demand (VOD), a videoconferencing stream, pre-recorded or live audio and isochronous metadata. The metadata will be discussed hereinafter and is generally ancillary data that is added by at least one of a client user viewing the integrated audio video streams and a hardware device that at least one of captures, processes, transmits and distributes data. This metadata includes but is not limited to telemetry data, security device events, user annotation and subtitles. The IVCF is the set of APIs designed to incorporate proprietary and/or open standard based software modules (plug-ins) into one client-server system which delivers multimedia data to a plurality of endpoints such as PCs and mobile devices. This IVCF allows for a plurality of highly scalable multimedia systems such as interactive collaboration applications, video security and surveillance applications, subscription based real-time video services (live broadcast, VOD), and other similar solutions to be designed and implemented.

These above described features, along with other pertinent features are shown in FIG. 1. Shown herein, the IVCF 10 includes at least one client 12 connected via a communication network to a plurality of servers wherein each server controls a specific function accessible by the at least one client 12. The communication network as used herein includes at least one of a wide-area network, local area network, telephone network satellite communication network or any combination thereof.

The at least one client 12 is connected to authentication and information servers 14, a media content management server 16, and content servers 18. In its broadest sense, the at least one client 12 establishes a connection with the information and authentication servers 14 in order to determine a permission level associated with the at least one client 12 regarding further access to the IVCF. Once authenticated and provided with information, the at least one client 12 contacts and requests content from the media content management server 16. The content stream requested by the at least one client 12 is provided by a respective content server 18. The media content management server 16 is an application that provides an index of the content stored on and able to be provided by the content servers 18. The at least one client is able to receive and view the requested content stream streamed by the content server 18. Additionally, the at least one client 12 may provide a manipulation request signal to the content management server 16 for selectively manipulating or editing a requested content stream to be at least one of received by the at least one client 12 and provided to another client connected within the system 10.

The authentication and information servers 14 of the IVCF of the system comprise a directory service 20 for Lightweight Directory Access Protocol (LDAP) queries, a user profile repository server 22 and a user profile backend SQL server 24. Authentication is performed with authentication service—for example Kerberos. The directory service 20 exists independently from the system and the system has read-only access to the directory service. The directory does not contain data specific to system. Instead, the user profile server 22 is stores data associated with the system such as, for example, overall system configuration, respective user data such as contact list etc. Additionally, the user profile server 22 may include permissions governing access to at least one of resources.

When the at least one client 12 is seeking to access the IVCF 10, the at least one client 12 establishes communication with the user profile repository to access profile data stored within the user profile repository 22. The at least one user is authenticated by an authentication protocol, such as Kerberos. Once authenticated by the Kerberos system, the at least one client may access the user profile server 22 and receives profile information. The profile repository server 22 may query the LDAP (Directory) server 20 for users' information and uses an SQL server 24 as a backend. The received profile information is selectively updateable by the at least one user 12. Communication for receiving and updating profile information data occurs by using Simple Object Access Protocol (SOAP) based in extensible markup language (XML) and which is transported using hypertext transport protocol (HTTP).

The media content server 16 is shown herein as a single entity for use in managing the media content selectively accessibly by the clients 12 connected to the system 10. However, this is shown for purposes of example only and any number of servers may be employed for managing the content.

The media management server 16 is associated with the respective content servers 18 and provides an index of content stored on the content servers 18 and further provides an interface for managing the stored content. The content servers 18 include server arrangements for providing pre-recorded and encoded content as well as for providing live captured content. For the purposes of this application the content provided by the content servers 18 includes but is not limited to audio-visual data, audio data and video data and any digital data that is able to be indexed and provided to a user in response to a request. Generally any digital entity that could be indexed and presented to the user (documents, pictures). The content servers 18 of the IVCF 10 include a pre-recorded content or video-on demand (VOD) server 26 for storing the VOD content. The VOD storage server 26 is connected to a VOD streaming server 28 which is responsible for providing the requested VOD content to the at least one client.

The content servers 18 further include live video sources 30 for selectively capturing live audio-visual content. The captured content is received by a live-video encoding server 32 for encoding the captured content. Once the encoding server 32 encodes the captured content, the live-video streaming server 34 receives the encoded video and provides the live video content to the at least one client.

Figure 2:
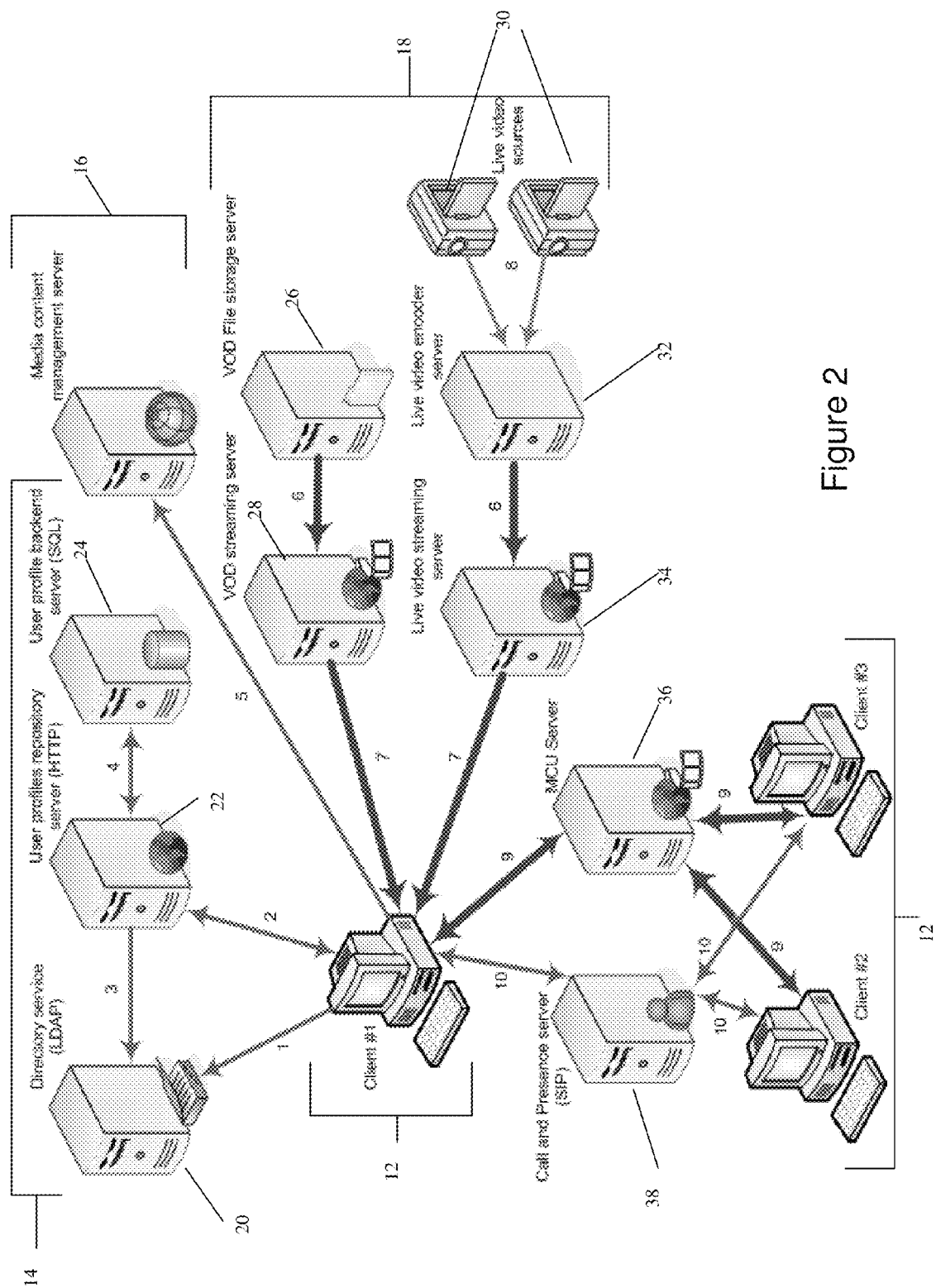
FIG. 2 is an illustrative view of multiple clients connected to the integrated video collaboration system according to invention principles.

FIG. 2 is an illustrative view of the IVCF 10 of the system having a plurality of clients 12 connected thereto. When a plurality of clients 12 are connected and using the IVCF 10, the IVCF connects the respective clients to one another as well as to the system for communicating with one other while simultaneously viewing the same requested content provided by the content servers 18.

To accomplish this connection, the IVCF shown in FIG. 2 includes the interconnected servers discussed hereinabove with specific reference to FIG. 1. Furthermore, the interconnection between the plurality of clients is accomplished via a Multipoint Conferencing Unit (MCU) Server 36 and a call and presence server 38. The call and presence server 38 utilizes at least one of Session Initiation Protocol (SIP) or H.323. For purposes of example only, the call and presence server 38 will be described as operating using SIP and is hereinafter referred to as the SIP server. The SIP server 38 allows the plurality of clients 12 to bi-directionally communicate with one another by, for example, handling calls between respective clients 12, exchange instant messages and notifications between clients 12. The MCU server 36 together with the SIP server 38 allows the plurality of clients to participate in multipoint media conference and provides "virtual rooms" wherein the communication occurring between the plurality of clients is focused. Thus, there is a reduced amount of direct communication occurring between the plurality of clients 12 of the system. The MCU server 36 is a user of the SIP Server 28 and the plurality of clients use SIP to communication with the MCU server 36.

There are two widely used IP real-time communication protocol stacks. One is the Session Initiation Protocol (SIP) described in RFC 3261, entitled "SIP: Session Initiation Protocol," dated 2002, and the other is the H.323 described in ITU-T Recommendation, entitled "Packet-based multimedia communications systems," dated 1998. Both are major protocols used in the audio/video applications industries. The detailed descriptions for these interface usages will use SIP for reference. The same methods are also applied to the H.323. These call control interfaces are fundamental communication blocks which handle all call setups (make a call, reject a call, hold a call, transfer a call, etc) as well as user presence status (in call, busy, off line, online, etc) This system allows for requests and communication between users that are processed using call processing servers.

As can be seen in FIGS. 1 and 2, the IVCF allows for a plurality of different clients to access a single system in order to establish a connection to simultaneously communicate with one another while viewing requested audio-visual content. Thus, the system supports a plurality of different standards and protocols. Specifically, the system supports LDAP, XML, HTTP, SIP, one-way live video and VOD streams and two-way multi-channel videoconferencing streams using different open standards including but not limited to MPEG-4 and H.264. Additionally, the IVCF 10 allows for the interacting standards to be universally cleared and allows any client 12, regardless of platforms used thereby, to be able to function within the system in the desired manner. Thus, each client 12 will function as if they are operating across a single uniform platform. This overcomes the complexity of separately implementing each of the applications and makes the IVCF scalable and open for integration with other tools.

Figure 3:
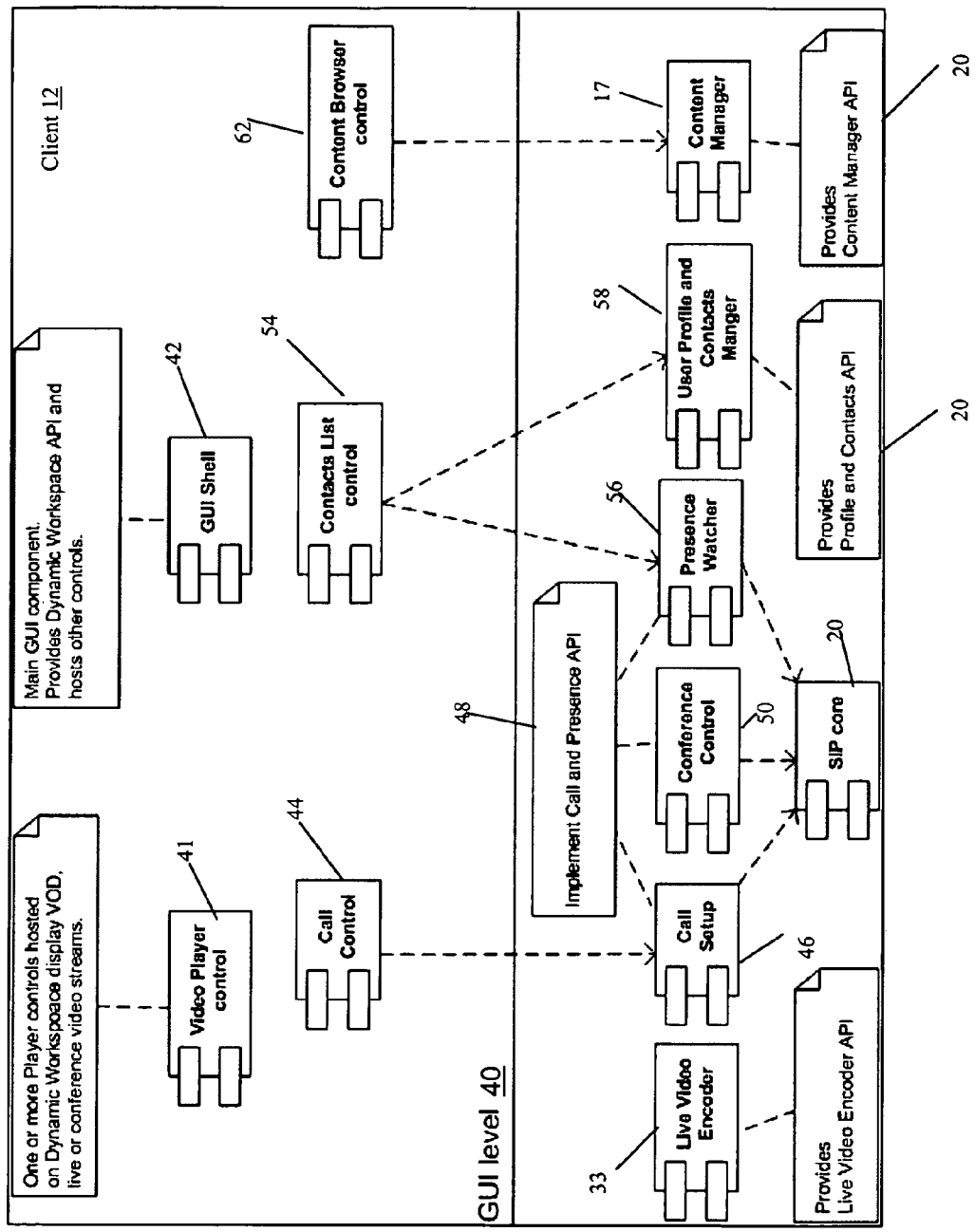
FIG. 3 is an illustrative view of the client architecture of the system according to invention principles.

FIG. 3 shows the object-oriented component architecture of the system. A respective API represents one piece of functionality (for example Call and Presence API, Content Manager API) and are implemented as one or more component applications that are interoperable in the following manner. FIG. 3 shows the graphical user interface (GUI) level 40 of the client machine which includes a plurality of interfaces for controlling and operating a plurality of applications. The objects shown north of the GUI line 40 are the interfaces for controlling the applications that are south of the line 40 The user controlled operation of the system 10 is governed by a GUI shell 42 which is the main GUI component of the system 10 and is responsible for providing a dynamic workspace API which houses, hosts and displays the other plug-ins or controls which are used by the client for at least one of controlling and interacting with the system 10.

The at least one client includes a plurality of applications having one or more GUI plug-in components or control mechanisms. As shown herein, each of the at least one client 12 includes a video media player control application 41 which controls viewing audio-video content data streams received from the content servers 18. Additionally, the video player control 41 controls a media player application which allows the user to control any live two-way video stream (i.e. video conferencing stream) received by the client 12.

The system 10 further includes a contacts list control GUI plugin 54 allowing the client to manage and access a list of other clients or users that have access to the IVCF so that the user may selectively establish a connection therebetween for interactive communication and/or simultaneously viewing content using the video player control API 40. The contacts list control plugin 54 further serves as user interface for Call and Presence application API 48 Additionally, the GUI shell 42 includes a call control plugin 44 for placing a call to other clients in response to user selection via the contacts list control plugin 54. The call control plugin 44 is the interface used to accessing and controlling the call and presence application API 48. The call and presence application API 48 48 further communicates with the video player control API 40 and allows for two-way audio-video communication to occur between a plurality of clients connected to the IVCF 10 of the system.

A content browser control plugin 62 is further provided on the client side within the GUI shell 42. The content browser control provides a user-responsive control for searching, requesting and manipulating content which is at least one of stored, distributed and controlled by the content manger 16.

The at least one client 12 includes a live video encoder processor 33 for encoding live-captured video data and for providing live encoded video data to at least one other client 12.

The at least one client 12 of the system further includes a the content manager application 17 for organizing, storing, and querying any request made by the client 12 using the content browser plugin 62 for content. The content manager application 17 further communicates with the live-video encoder application API 32 (streaming server) in the case when a request is received from the client 12 for a live video source to be displayed. Additionally, the content manager 17 communicates with a pre-recorded video application (not shown) which controls and governs the transmission of VOD data that is stored by system. The content manager API 16 may also provide the live encoded video from the encoder (streaming server) 32 directly to a pre-recorded video API (not shown) for immediate storage thereof so that the live encoded video will later be accessible as a VOD content stream. This can occur simultaneous with the original transmission via the streaming server 34 to the plurality of clients or, depending on system resources and conditions, occur in a delayed manner using a buffering system that may be located local to any server having any of these API's present thereon.

Once connected, each client has apparatus for capturing audio and video data via a conference signal for transmission via the IVCF for processing and further re-transmission of the conference signal to other clients.

The processing of the conference signal is performed by the conference control application API 50. Upon receiving the conference signal, the video control API opens additional windows within the GUI shell 42 that allow for display of the video data contained in the conference signal. The video player API 40 is also able to decode and cause any audio data contained in the conference signal to be output via speakers connected to the respective client-side machine.

A user profile and contacts manager application API 58 stores, manages and makes available contact information to a respective client connected to the system. These permissions administratively configurable to govern whether or not a client is able to access a specific group collaboration at a particular time as well as at least one of allow and deny access to content provided by the content servers 18. The administrator of the system is able to selectively determine any permission rating for each respective operation performed by the system 10. The profile and contact manager 50 is selectively accessed in response to a client inquiry made using the contacts list control 54.

Using unified application interfaces (COM and/or .NET) allows for building a variety of task-specific applications and for integrating third party multimedia technology. Client applications could be implemented in several programming languages (C++, C+C#, Visual Basic) and in various environments: as standalone or Web applications. Homogenous framework APIs for GUI components enables highly customizable dynamic user interfaces tweaked for performing a particular task. These APIs are designed for applications displaying several video windows simultaneously and allow for the addition of custom controls in run time (for example, control for annotating currently played live video stream).

Figure 4:
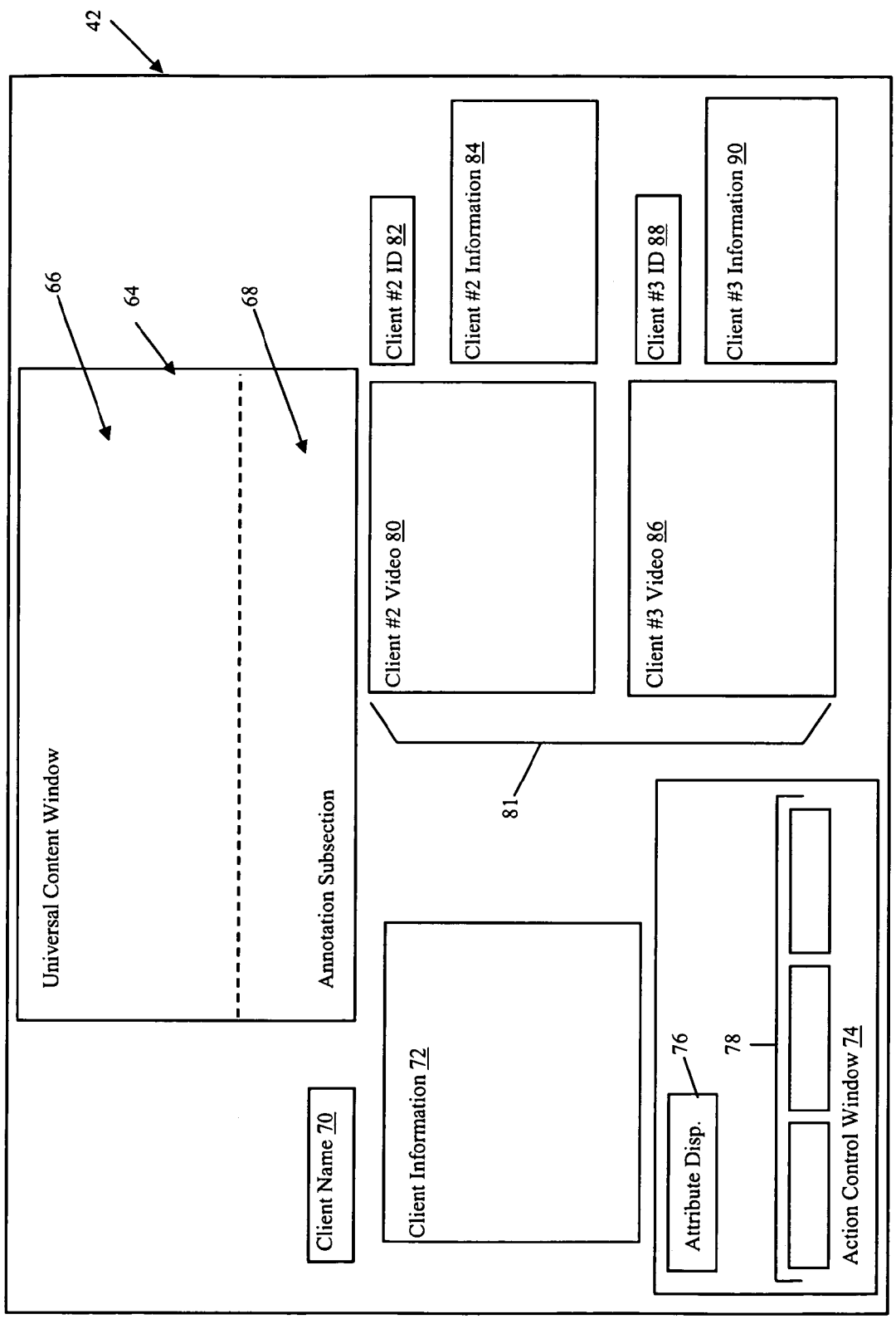
FIG. 4 is an illustrative view of a screenshot taken from a client workstation while using the video collaboration system according to invention principles.

FIG. 4 is a screen shot of a client machine showing the use of a plurality of API's of the system. Shown herein is the dynamic GUI interface 42 which is operable using any computing operating system such as Microsoft Windows®. The GUI 42 includes a plurality of sub-windows that are selectively caused to open in response to commands from one of a plurality of API's discussed above with respect to FIG. 3.

The GUI 42 includes a universal content window 64 comprising a first content section 66 and a second annotation section 68. The universal content window 64 is able to selectively display at least one of live video data and pre-recorded video data that has been requested by any one of a plurality of clients 12 connected to the IVCF. Typically, the content window 66 fills the entire boundary outlined by the universal content window 64. However, the annotation section 68 selectively displays any annotations made by any clients that are viewing the content in the first content window 66.

A first client ID window 70 is displayed within the GUI and displays information representing the client who is logged into the IVCF on the local machine. A client information window 72 contains personal information and preferences associated with the client displayed in the first client ID window 70. Additionally, the client information window 72 contains additional information such as contact An action control window 74 is shown here and presents the user with a single window which provides a central control for operating the API's associated with the system. Shown herein, the control window includes an attribute display window 76 and a plurality of function buttons 78. The attribute display window 76 is able to display information associated with any of the other windows open within the GUI. For example, the attribute window 76 can selectively display a title and time stamp information associated with the content displayed in the universal content window 64. The function buttons 78 provide the user with selectable commands which control the operation the API's. The function buttons 78 can be mapped to incorporate the functions able to be performed by the system 10. Additionally, the action control window 74 is able to display different function buttons 78 at different times in response to at least one of user selection of desired functionality or automatically in response to a signal transmitted and/or received by a respective API component.

The GUI 42 further includes a plurality of communication windows 81. As shown herein, the communication windows 81 include a second client video window 80 for displaying video data of a second client. A second client identification window 82 displays data representing the identification of the second client that is selectively viewable in the second client video window 80. Also, a second client information window 84 is present and allows for additional data associated with the second client to be displayed. The GUI 42 further includes a third client video window 86, a third client identification window 88 and a third client information window 90. The embodiment shown in FIG. 4 is available when three clients are connected with one another via the IVCF and are simultaneously viewing content in the universal content window 64 while participating in two-way video conferencing.

FIG. 4 shows an exemplary screen shot of an application or plugin that is used by each client connected to the system. The positioning of the windows within the GUI 42 is for purposes of example only and are not critical to the operation of the system. Each window having respective content or control apparatus displayed therein can be combined with any other window wherein the data displayed therein or controlled thereby is included in the combined window within the GUI 42.

Figure 5:
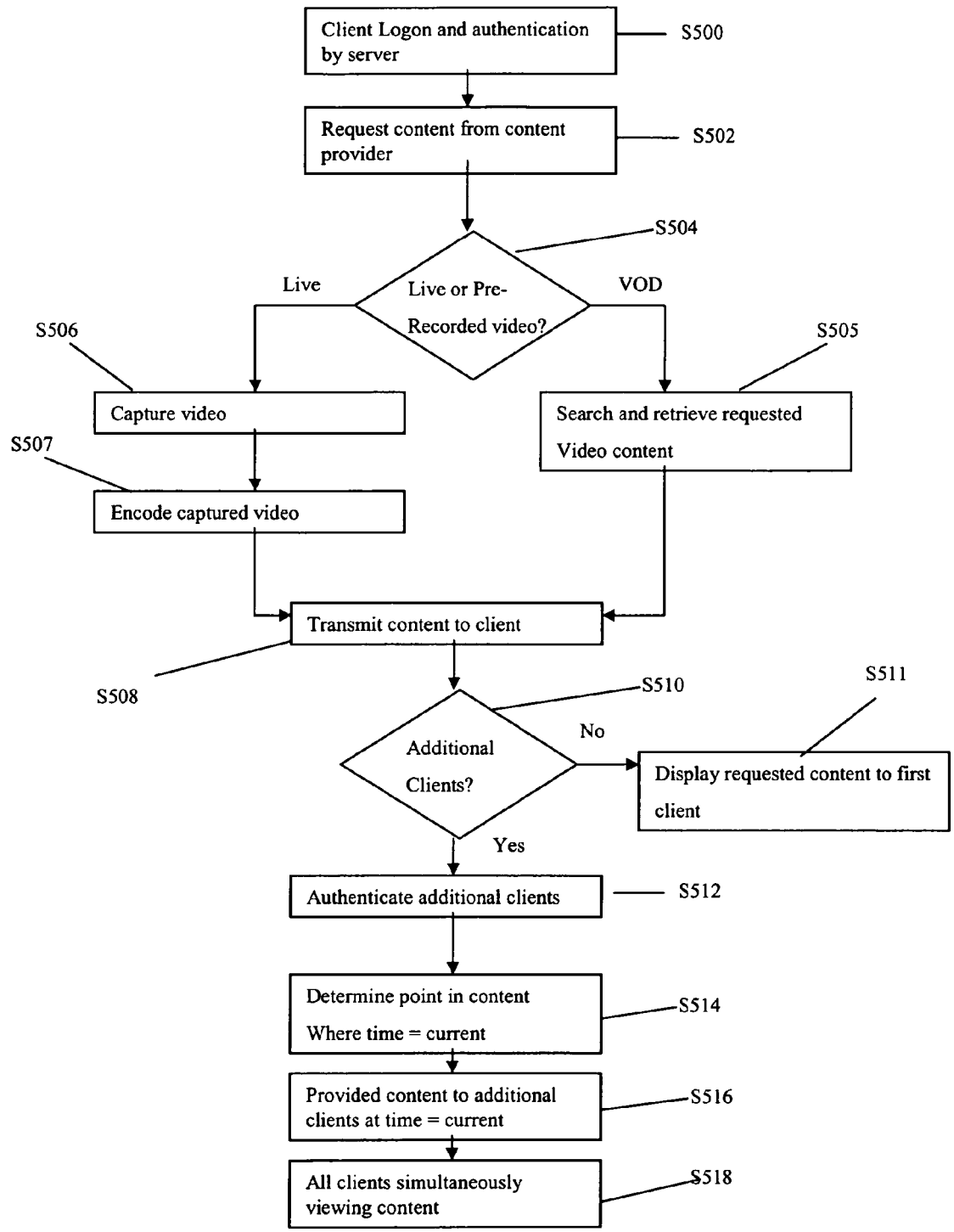
FIG. 5 is flow diagram detailing the transmission of content via the video collaboration system according to invention principles.
Figure 6:
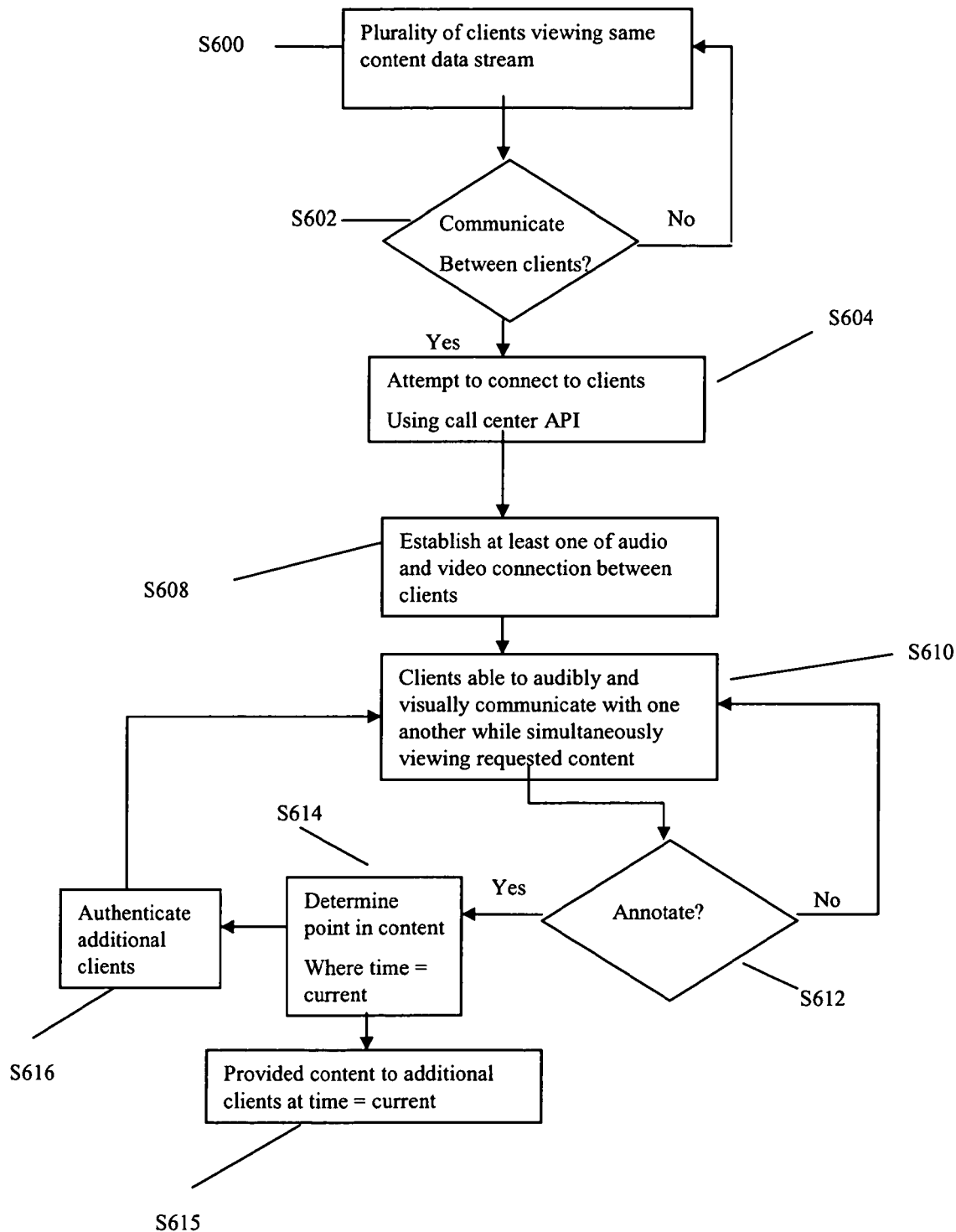
FIG. 6 is a flow diagram detailing client interaction while using the system according to invention principles.

FIGS. 5 and 6 are flow diagrams that detail the operation of the system. The operation of the IVCF 10 discussed in FIGS. 4 and 5 will also make reference to the elements disclosed in FIGS. 1-3 that are responsible for the operative steps discussed in FIGS. 4 and 5.

Beginning with FIG. 5, in step S500, a client logs into the IVCF 10 and is authenticated by the authentication and information servers 14. The process of logging into the IVCF comprises interaction of the information servers 14 with the client machine 12. Logging into the system further comprises authorization of each user.

Each user registered in the system has profile which includes but is not limited to a collection of application settings (contact list, URL of video mail server, URLs of VOD or live streaming servers, etc.) and personal file storage (for example for snapshots, or samples of video mail response messages, etc).

When a client 12 attempts to access the system first time, the profile server 22 attempts to authenticate the status of the client using a default authentication service (for example Kerberos). If the client 12 is authenticated, profile server 22 creates new account. Profile server checks for group membership, if any, of the new user using LDAP to communicate with Directory service and applies any default permissions contained within the directory service.

The profile stored on the profile server of a respective client 12 includes at least one of 1. Group settings: Every user in the group has the same settings. An administrator can selectively configure the group settings for respective group members. Examples of data: URL of video mail server, URLs of VOD or live streaming servers, list of available streaming video channel, etc.
2. Public (shared): User can store any data which will be available for other system users here.
3. Private: Only The Owner Of The Profile Or The System Administrator Can Modify Data in this profile part. Example: user's contacts list, favorites, etc.

The client-side application selectively accesses (reads and writes) profile data in the form of XML using SOAP via HTTP and allows the user to access and manage his or her profile via Web browser or other access window that is visible within the GUI display 42. Once logged in, the client machine receives data representing the group settings as discussed above which function as permission levels by which the client 12 must abide while connected to the IVCF 10. These permissions provide a working framework within which the user must operate. Additionally, the client machine is able to receive data representing public and private settings for display within the client information window 72 within the GUI 42. The display design within the client information window 72 is at least one of user selectable and pre-designed according to predetermined rules and requirements set by the administrators of the The data from the directory service server 20 is displayable via the user profile repository server 22 within the client information window 72 in the GUI 42. The user profile repository server 22 does not duplicate the functionality of the Directory Service server 20 in that the user profile repository server 22 does not replicate data from Directory service (person e-mail, phone numbers, etc.). Rather, the user repository server 22 contains links to the records representing at least one of group settings, public settings and private settings that are stored in Directory Service server 20 database. Thus, in contrast to the Directory Service server 20 which is optimized for read operations, the user profile repository server 22 is a general use server/database with effective read and write operations for text and binary data. This is advantageous is that the system 10 needs read-only access to the Directory Service server 20 for searching and browsing the directory. Application specific data is stored separate from the Directory Service server 20 and the directory service server 20 remains independent from the system 10 as whole.

Once successfully logged into the system, the user is able to request content via the content management server 16 from the content provider servers 18 as shown in step S502. The content management server 16 must make the determination as shown in step S504 whether or not the requested content is live content or pre-recorded content. If the content management server 16 determines that the requested content is pre-recorded or VOD content, the management server 16 queries the VOD storage server 26 to locate the requested content stored therein as shown in step S505. Alternatively, if the content management server 16 determines that the content requested is live content, step S506 causes the audio-video capture devices 30 to begin capturing the content from the source thereof. The captured content is encoded as per step S507 via the live video encoding server 32. Once the content is retrieved as shown in step S505 or the content has been successfully encoded as in step S507, the content is transmitted to the at least one client 12 as described in step S508. Step S508 is accomplished by the VOD streaming server 28 when the requested content is pre-recorded and originates from the VOD storage server 26 and may also be accomplished by the live-video streaming server 34 when the content is live content which has been encoded by the encoding server 32.

Once transmitted to the at least one client 12 as shown in step S508, a determination in step S510 is made regarding the number of clients 12 connected or able to connect to the IVCF 10. This determination allows for the IVCF 10 to allow a plurality of clients to connect to the system 10 and view any content being transmitted thereacross. If the outcome of the step S510 determination yields no additional clients, the IVCF 10 causes the requested content transmitted by at least one of the VOD streaming server 28 and the live content streaming server 34 to be displayed on the client machine as shown in step S511.

If, however, the determination in step S510 yields that a plurality of clients are able to access the requested content, the additional clients are authenticated in step S512. Once authenticated, the media content manager 16 is able to determine a location in the content stream wherein a time value equals the current as shown in step S514 and causes the content to be provided to the other clients beginning where time value=current as shown in step S516. This allows for the addition of clients that are authenticated after the transmission as discussed in step S508 has begun to view the content. Furthermore, this allows for the additional clients to be seamlessly integrated with the system to provide true collaboration between the clients connected to the system and allow clients connected to the system to simultaneously view the content stream as in step S518.

FIG. 6 details additional functions of the system that are selectively useable when a plurality of clients/users are connected within the system 10 and are simultaneously viewing the same content stream over a communications network as shown in step S600. Once the content stream is provided to each of the clients/users connected to the IVCF 10, the content is caused to be displayed within the universal content window (player window) 64 within the GUI 42. A determination is made in step S602 whether or not the clients viewing the content wish to establish two-way communication with one another. If the clients do not wish to or do not need to establish two-way communication with one another, the system remains operating according to step S600.

If it is determined that the clients do wish to establish two-way communication with one another, step S604 shows that at least one client will attempt to connect to each of the other clients using the call center API 48. This process can be selectively initiated by activating a command button 78 within the action control window 74 of the GUI 42. As discussed above, the system provides the actions available to the respective user within the action control window 74. Once the call center API 48 is initiated in step S604, the call center API 48 determines which protocol is being used by the other users connected to the system 10. If the users who wish to establish two-way communication with one another are using the same communication protocol, the call center API 48 establishes at least one of an audio connection and video connection between the clients as shown in step S608.

The connection of clients as shown in step S608 is realized on the GUI 42 by the appearance of communication windows 81. As shown in FIG. 3, and for purposes of example only, the following discussion will include three clients/users connected to the system viewing the same content stream in the universal content stream player window 64. The GUI 42 shown in FIG. 3 is associated with the first client and is described from the vantage point of the first client. Additional communication windows 81 will be displayed or be made available for display on the GUI 42 for each connected user/client and each user/client will have a similar display on their respective local machine.

When the connection is made to establish two-way communication between the first, second and third clients, communication windows 81 are caused to be open for display within the GUI 42 of the first client and the clients are able to at least one of audibly and visually communicate with one another while simultaneously viewing the requested content as in step S610. The actions detailed in step S610 are accomplished when data representing a video capture of the second client is displayed within the second client video window 80 and data representing video capture of the third client is displayed within the third client video window 86. The video data representing each of the second and third clients is captured by input devices connected locally to the second client machine and the third client machine. Additionally, the first client machine includes a video capture device for capturing video data which is transmitted and displayed on each of the second and third clients respective GUI (not shown).

This effectively establishes a live video conference between the first, second and third clients that is to occur in conjunction with viewing a requested content stream in the universal content window 64. The clients are therefore able to simultaneously view and discuss the content being streamed to their respective GUI 42. While the IVCF 10 is described herein for use with three clients, the IVCF 10 is selectively scalable to incorporate any number of users thereby establishing audio-visual bi-directional communication between each user/client.

While the clients/users are participating in the bi-directional communication with one another as in step S610, the system in step S612 provides each client with the option of making an annotation to at least one of the streaming content or the video conferencing content viewable within the GUI 42. If no client/user wishes to make any annotations, the clients return to step S610 and continue communicating and viewing the content.

If any of the user/client wishes to annotate the content, the respective client adds data, preferably in the form of metadata, to the content stream as shown in step S614. The added data may be sent along with at least one of the requested content stream which is being displayed in the universal content window 64 and with the video-conference data stream which includes the video data representing the other clients with which the first client is in communication. The added annotation data is transmitted from the annotating client via the content management server 16 for receipt by the other clients as shown in step S616 Once the data is received by the clients its displayed within the GUI 42 in response to a determination of they type of annotation.

The annotations as stated in step S614, allow at least two users to selectively add metadata to any one of the live streams as well as query stored video for previously recorded streams in response to the entered metadata. The metadata being added or entered for use as a request mechanism includes any data that describes or manipulates any other piece of data and includes for example, telemetry data, security device events (non-user generated data), user annotation and subtitles. When a user selectively adds metadata to the received stream of video data, the metadata appears as an annotation that is superimposed in at least one of within a frame, external to the frame, a hotspot, and a selected area of interest on a video picture. These examples of metadata are listed for purposes of example only and any form of an annotation may be made to the content stream by any of the clients viewing the live stream.

Because the system is able to use metadata as a requesting mechanism, the IVCF is fully searchable by any of the at least two clients utilizing the system. Specifically, when the metadata is entered by the user for performing a query, the IVCF is able to process the metadata and search for data representing a selected location within a respective pre-recorded video data stream. This includes data streams that originate as video on demand data streams as well as live capture and broadcasted video streams. Additionally, the metadata request entered by the user allows for the user to selectively search through any of the annotations added by any one of the at least two users connected to the IVCF.

The metadata used by the system 10 is encoded using XML directly within the data stream being transmitted for receipt by the at least one client. The metadata may be generated by media source apparatus and encoded within the data stream produced when the video data is being captured by the apparatus. The metadata includes at least one of camera telemetry data (i.e position and direction of the camera), event information for example, that capture apparatus began recording at a predetermined time in response to a predetermined event Thus, the metadata is embedded in stream by encoder system and is read and used by the media content manager for updating the index of the content within the system. The metadata aids in the indexing operation of the media content manager 16 by encoding, using XML, data used to delineate blocks of multimedia frames, data used to communicate the type of blocks and data representing a description of the content with which the metadata is associated. Metadata is selectively added by an entity that has permission to do so. The entity may include, but is not limited to, users, administrators, hardware devices and software applications.

The ability of the IVCF to utilize metadata in the above described manner is due to the flexibility of the data streams encoded and used by the IVCF. The flexibility of the streams used by the IVCF allow for the addition of previously non-encoded syntax, i.e. the annotation and/or the search string. The metadata being added to the stream can be any data that a user may desire to add to the stream.

The IVCF provides for any of the users connected thereto to extract at least one frame or a related series of frames from a received video stream. The at least one frame or related series of frames is stored in an image database. The images may be stored in at least a user profile storage, imported to the media content management server, and stored locally. Alternatively, the users connected to the IVCF are able to extract other types of data being broadcast over the system. The other types of data able to be extracted by the user includes but is not limited to the metadata annotations entered and broadcasted by a user, metadata entered and used as search strings, a video clip or part of a videoconference session and audio data that is part of the received video data stream or related in a predefined manner to the video data stream.

Once data transmitted via the IVCF is extracted by a user, the extracted data is able to be further manipulated by an external application. For example, the captured frame from a video stream is selectively editable by a user using a third-party application and further transmitted to another user via electronic mail. Additionally, the extracted data can be embedded into a data stream for transmission to at least one of another user or a remote server.

For example, if the first client wishes to comment on a portion of the received content stream, the client can bring up the annotation menu in the action control window 74 and initiate the annotation function. The user can selectively insert the metadata within the content stream and, upon receipt by the additional clients, the annotation subsection 68 of the universal content window 64 is caused to open and display the received annotation data therein. The annotation subsection 68 is described for purposes of example only and annotation data may be selectively displayed in any window within the GUI 42. The system 10 determines the position of the annotation data using an XML-based Synchronized Multimedia Integration Language (SMIL) that defines how various mixed media content are presented to a viewer The system is highly scalable and allows a plurality of users at various locations to collaborate with one another by simultaneously viewing two types of multimedia data streams and providing an interface to facilitate communication between the users in response to any of the types of multimedia data streams being transmitted and received by users via the system.

The system includes a plurality of applications accessible via respective application interfaces for providing real-time communication and collaboration between a plurality of system users. This real-time communication and collaboration between users is accomplished using a plurality of open protocols such as SOAP, Kerberos and LDAP for governing access to and communication between the user profile repository. The user profile repository is a central access point for all client users of the system. The user profile repository, in addition to providing contact information and user permission levels for system access, provides a publishing point for any new service that is available to users of the system which allows each respective client to adaptively learn and access new system features and functionality.

The system includes task-oriented dynamic workspace to reduce the complexity generally associated with a plurality of applications. Additional features of the system are made available by the user profile repository in the form of an on-demand acquirable module provided in response to a first time user request (and appropriate authentication) for access the feature of the system. The functionality provided by the module is implemented as a interface plugin that may be dynamically hosted by the workspace.

Furthermore, the system provides for the above communication and collaboration using a plurality of types of multimedia content. The system uses real-time communication protocols such as SIP for establishing messaging sessions and interactive communication between users via at least one of audio conferencing and audio-video conferencing along with using T.120 for document conferencing. The system further provides for delivery of real-time multimedia content using delivery protocols such as Real Time Transfer Protocol (RTP) and Real Time Streaming Protocol (RTSP). Further support is provided for multimedia presentations using Synchronized Media Integration Language (SMIL) for providing multiple media files together to at least one user.

What is claimed is:

1. An apparatus that enables a user to interactively collaborate with a plurality of users via a communication network, the apparatus comprising:
   a processor that enables the user to request a one way data stream from a media content server having an index of one way data streams stored on a data server, and receives from the data server, the requested one way data stream, wherein receipt of the requested one way data stream is based on a priority level associated with the user, the priority level including information governing access to particular one way data streams including audio and video data streams;
   a communication processor that enables real-time bidirectional communication between the user and any of the plurality of users based on the priority level associated with the user; and
   a display processor that generates a display image simultaneously displaying the one way data stream and the bidirectional communication in a single window.

2. The apparatus of claim 1, wherein
   the processor accesses a profile repository that stores the priority level associated with the user and provides an address enabling any of the plurality of users to access and bidirectionally communicate with the user.

3. The apparatus of claim 1, wherein
   the one way data stream includes an encoded live audio video data stream and the display processor displays the encoded live video data stream in the single window.

4. The apparatus of claim 1, wherein
   the communication processor enables the user to conduct at least one of audio conferencing, audio video conferencing and document conferencing with any of the plurality of users.

5. The apparatus of claim 4, wherein
   the audio conferencing and audio video conferencing is controlled using a real time communication protocol.

6. The apparatus of claim 5, wherein
   the real time communication protocol is SIP.

7. The apparatus of claim 4, wherein
   the document conferencing is controlled using a T.120 protocol.

8. The apparatus of claim 5, wherein
   the audio conferencing and audio video conferencing establishes at least one of a messaging session and interactive communication session between users.

9. The apparatus of claim 1, wherein
   the processor receives the requested one way data stream from the data server using a real time transfer protocol.

10. The apparatus of claim 1, wherein
    the display processor generates a user-interface enabling annotation of the received one-way data stream, the user-interface being displayed simultaneously in the single window with the one-way data stream and the bidirectional communication.

11. The apparatus of claim 10, wherein
    the user interface enabling annotation receives data representing at least one type of annotation from the user in a markup language; and
    the communication processor communicates the received data representing at least one type of annotation to any of the plurality of users that are bidirectionally communicating with the user via the communication network.

12. The system of claim 11, wherein
    the data representing at least one type of annotation includes metadata.

13. The system of claim 10, wherein
    the annotations are displayed in the single display window simultaneously with the one-way data streams and the bi-directional communication and are superimposed in at least one of (a) within a frame of video data, (b) within an area external to a frame of video data, (c) a hotspot, and (d) a selected area of interest on a video picture.

* * * * *